United States Patent [19]

Croft

[11] Patent Number: 5,145,624

[45] Date of Patent: Sep. 8, 1992

[54] PRESSING OF WHITEWARE CERAMIC ARTICLES

[75] Inventor: Alan P. Croft, Lake Jackson, Tex.

[73] Assignee: The Dow Chemical Company, Midland, Mich.

[21] Appl. No.: 390,323

[22] Filed: Aug. 7, 1989

[51] Int. Cl.⁵ .............................................. C04B 33/20
[52] U.S. Cl. ...................................... 264/109; 264/63
[58] Field of Search ............................ 264/63, 86, 109

[56] References Cited

U.S. PATENT DOCUMENTS 3,226,784  1/1966  Owen et al. .
3,418,401  12/1968  Henry et al. ........................... 264/86
3,507,944  4/1970  Moore .
4,124,667  11/1978  Coppola et al. ....................... 264/86
4,915,890  4/1990  Koblinski et al. ..................... 264/86

Primary Examiner—James Derrington

[57] ABSTRACT

A process for the preparation of whiteware ceramic articles employs an alkylenediamine, such as ethylenediamine, as an additive to increase the green strength of articles prepared by pressing. Optionally, the additive includes a latex such as a styrene butadiene latex in an amount effective to further improve the green strength of the articles prepared.

11 Claims, No Drawings

PRESSING OF WHITEWARE CERAMIC ARTICLES

BACKGROUND OF THE INVENTION

The present invention relates to the preparation of whiteware ceramic articles by pressing.

It is known that various whiteware ceramic articles may be prepared by pressing. Examples of different types of pressing techniques include uniaxial pressing, isostatic pressing, dry pressing, hot uniaxial pressing, hot isostatic pressing and hot dry pressing.

Dry pressing is an example of a well-known pressing technique by which ceramic articles are prepared. In dry pressing, a particulate material is suspended in a slurry medium, generally with other additives selected to control both the properties of the slurry and the properties of the article ultimately prepared from the slurry. The solvent is removed to prepare a powder having particles of the desired size or range of sizes. This powder is then placed into dies having the desired shape and pressure is applied to form the green ceramic article which undergoes additional processing. The pressure involved in dry pressing is applied either unilaterally as in dry pressing or from all directions as in isostatic dry pressing. Pressing operations may be carried out at various temperatures including room temperature or elevated temperatures.

While pressing techniques are well-known to those skilled in the art, there are some problems associated with these processes and the articles produced therefrom. A particular example of such problems concerns poor green strength. Attempts have been made to use various additives to correct such problems. For example, it is known to use substances known as binders such as polyglycols to increase the green strength of ceramic articles prepared by pressing. Typically, these binders are added at a level of several percent to result in significantly improved green strength. Unfortunately, the necessity of adding several percent of these additives frequently results in ceramic articles with undesirably altered characteristics.

It is desirable to have an additive for use in the preparation of whiteware articles by pressing which would be effective at low dosages, have low molecular weight, good burnout characteristics, and would result in pressed whiteware articles having good properties such as high green strength.

SUMMARY OF THE INVENTION

The present invention is a process for the preparation by pressing of whiteware articles comprising preparing a slurry including an additive comprising an alkylenediamine, a clay particulate material, a dispersant and a slurry medium and using conventional pressing techniques to prepare whiteware ceramic articles therefrom. In addition to the alkylenediamine, the additive useful in the present invention may include a latex. The additive is used in an amount effective to increase the green strength of the articles prepared therefrom when compared to articles prepared from identical slurries save for the presence of the additive.

Surprisingly, the use of the additive of the present invention improves the green strength of articles pressed from the slurry without significantly adversely impacting tee rheology of the slurry.

DETAILED DESCRIPTION OF THE INVENTION

The process of the present invention advantageously utilizes a slurry composition comprising a clay particulate material, a dispersant, a slurry medium, an alkylenediamine and, optionally, a latex. The slurry composition will also preferably comprise additional additives.

For purposes of this invention, the terms "slurry" and "slurry composition" include the slurries or suspensions from which powders are made for use in pressing of whiteware ceramic articles. Whiteware ceramic articles are ceramic articles such as tile, pottery, porcelain and similar fine-grained porcelainlike compositions as discussed by Kingery et al. in *Introduction to Ceramics*, 2nd Edition, John Wiley and Sons (1984) at page 16.

The clay particulate material can be any clay particulate substance which can be suspended in a slurry medium, formed into a powder and then pressed into a whiteware article such as tile. Preferred clay materials include ball clays, kaolin clays, pyrophyllite, feldspar, flint and the like. Mixtures of particulate materials can be employed. Several particulate materials are well-known to those familiar with the art of pressing whiteware ceramic articles.

The slurry medium serves to suspend the clay particulate material until it can be formed into a powder and pressed. Typically, the slurry medium is a liquid and can be organic, inorganic, or a mixture thereof. Several media are well-known to those skilled in the art of ceramic processing. Examples of slurry media include alcohols, hydrocarbons, chlorinated hydrocarbons and water. The preferred medium is water. The clay particulate material can be employed in any amount which will result in a formed article. Typically, the amount of clay particulate material employed is from about 5 to about 95 weight percent based on the weight of the slurry. Preferably, the amount of particulate material employed is from about 25 to about 90 weight percent. However, the slurry composition can vary widely and can contain more or less particulate material. Mixtures of slurry media can be employed.

The dispersants useful in the practice of this invention are those known to one skilled in the art of pressing clay particulate material into whiteware ceramic articles. Typically, the dispersants are polyelectrolytes or inorganic compounds and comprise a cationic species such as an ammonium or sodium ion on a polymeric or inorganic carrier. Non-limiting examples of dispersants useful in the practice of this invention include the sodium or ammonium salts of polyacrylates or polyacrylamides. Other useful dispersants include ammonium lignosulfonate and other lignosulfonates. Specific preferred examples include sodium hexametaphosphate and sodium silicate.

Other additives which are well-known in the art of ceramic pressing can be employed in addition to the clay particulate material and the slurry medium. Non-limiting examples of such additional additives include binders and lubricants. For example, lignosulfonates, polyvinylalcohols, polyglycols, polyethers and alkanolamines are binders known to be useful in increasing the green strength of ceramic articles, such as tiles, when used at sufficient levels, typically at several weight percent. The nature and amount of the additives used control the characteristics of the slurry composition and articles which are prepared therefrom and will be selected by one skilled in the art based on the whiteware ceramic article being produced and the processing conditions.

The slurry formulations which are useful in the process of this invention are those formulations useful in the production of whiteware ceramic articles such as wall tiles, floor tiles, decorative tiles and insulating tiles. Greenware prepared using these formulations generally lack high green strength. The alkylenediamine additives of this invention are useful in increasing the green strength of the articles prepared using these slurry formulations. In a preferred embodiment, the green strength is increased by at least about 5 percent. It is more preferred that the green strength is increased by about 25 percent and most preferred that it is increased by about 50 percent. Green strength can be measured by criteria known to one skilled in the art such as by measurements of modulus of rupture or of compressive strength.

Alkylenediamines useful as additives in the process of the present invention are well-known compounds. The preferred compounds are $C_{2-6}$ diamines such as, for example, ethylenediamine, propylenediamine, butylenediamine, pentylenediamine and hexylenediamine. The most preferred diamine is ethylenediamine.

In addition to the alkylenediamine, the additive of the present invention may optionally include a latex. The latex serves to further improve the green strength of the prepared ceramic article. Non-limiting examples of preferred latexes include styrene-butadiene latexes, acrylic latexes and ethylene-acrylic acid latexes. Styrene-butadiene latexes are more preferred.

The additive of the present invention is employed in an amount effective to increase the green strength of prepared ceramic articles such as tiles. It is preferred that the additive be used in an amount of at least about 0.0001 and no greater than about 5 weight percent based on the solids content of the slurry. It is more preferred that the amount of the additive used is at least about 0.01 and no greater than about 2.0 weight percent. Most preferably, the amount of the additive is at least about 0.05 and no greater than about 1.5 weight percent based on the solids content of the slurry.

When the additive of the present invention comprises both an alkylenediamine and a latex, the ratio of alkylenediamine to latex is any which will result in a slurry composition from which a whiteware ceramic article may be produced using pressing techniques and having a green strength in excess of the green strength of an article prepared from a slurry without the alkylenediamine and latex. A preferred weight ratio of alkylenediamine to latex is at least about 5:95 and no greater than about 95:5. It is more preferred that the weight ratio is at least about 30:70 and no greater than about 70:30. It is most preferred that the weight ratio of alkylenediamine to latex is about 50:50.

When the additive of the present invention includes both the alkylenediamine and the latex, the two components may be added to the slurry composition separately. Alternatively, the alkylenediamine and latex may be mixed together, optionally with water, and added to the slurry composition at once. When the alkylenediamine and latex are mixed together before being added to the slurry composition, it is preferred to mix the two components by preparing a suspension of the latex and an aqueous solution of the alkylenediamine and adding the amine solution to the latex suspension with stirring. When mixed with water, the weight ratio of active ingredients, i.e., alkylenediamine and latex to water is preferably about 1:1. However, other ratios may be used.

Pressing processes used to prepare the whiteware ceramic articles prepared using the present invention are generally practiced as they would be in the absence of the invention. That is, temperatures, pressures, additives other than the alkylenediamine or alkylenediamine/latex and overall processing methods are not changed in the practice of the current invention.

The slurry composition of the present invention is prepared and the solvent is removed to yield a powder of the desired consistency. The powder is placed in dies of the appropriate size and shape and subjected to elevated pressures either unilaterally in the case of conventional dry pressing or from all sides in the case of isostatic pressing. Pressures commonly used in uniaxial or isostatic pressing generally range from about 1000 to about 30,000 psi although higher or lower pressures may be used. Pressing is typically conducted at ambient temperatures although elevated temperatures may be used.

SPECIFIC EMBODIMENTS OF THE INVENTION

The following examples are given to illustrate the invention and should not be construed as limiting its scope. All parts and percentages are by weight unless otherwise indicated.

POWDER PREPARATION PROCEDURE

To a 16-ounce polyethylene bottle containing five alumina balls are added the following: 4.8 g sodium hexametaphosphate 25 percent solution (0.3 weight percent of the dry ceramic powder), 163.4 g deionized water (40.8 weight percent of the dry ceramic powder) and an amount of 30 percent aqueous binder solution to provide the percentage of binder solution given in the tables (weight percent based on dry ceramic powder). In addition, an amount of 50 percent aqueous additive solution corresponding to the additive percentage given in the tables (weight percent based on dry ceramic powder) is added. The bottle is shaken vigorously by hand. Then, 400 g of red body ceramic powder is added. Red body powder is a mixture of ball clay (20 percent), feldspar (20 percent), pyrophyllite (20 percent) and red clay (40 percent). When all the powder is thoroughly wetted, the bottle is capped and shaken vigorously for 30 minutes in a mechanical shaker. At the end of the shaking period, the slurry is poured through a 100 mesh sieve into a glass baking dish. The dish containing the screened slurry is placed in a 50° C. oven for 24 hours. After heating, the material is allowed to cool, broken up, pulverized with mortar and pestle and passed through a 60 mesh sieve. The resulting powder is used in the tests described below.

Pellet Preparation and Testing

Fifteen-gram portions of the prepared powder are pressed into cylindrical pellets of approximately 1.25 inches in diameter and 0.5 inches in height using a die set and press at 5 kpsi. The mass (m), diameter (d), and thickness (t) are precisely determined for each pellet. The pellets are diametrally loaded using an Instron testing machine (Model 1102 with the following settings: 1000 lb load cell, full scale load set to 20 lb, crosshead speed 0.2 in/min). The load at failure is recorded.

The green density (D) and the compressive strength (S) are calculated with the following formulas:

$$D = m/[3.14159(0.5\ d)^2 t]$$

where,
D = green density, g/cc
m = mass, g
d = diameter, cm
t = thickness, cm, and $$S = 2P/3.14159 dt$$

where,
S = green strength, psi
P = load at failure, lb
d = diameter, in
t = thickness, in.

EXAMPLE 1

The green strength and green density of the pellets prepared as described above were tested using 1 weight percent additive. The results obtained are shown in Table I below.

TABLE I

| ADDITIVE | GREEN DENSITY (g/cc) | GREEN STRENGTH (psi) |
| --- | --- | --- |
| None[1] | 1.74 | 19.18 |
| Ethylenediamine[1] | 1.75 | 25.14 |
| Latex[1][2] | 1.73 | 26.22 |
| Ethylenediamine/latex[2][3] | 1.73 | 29.78 |

[1] Not an embodiment of the invention.
[2] A styrene butadiene latex available commercially from The Dow Chemical Company as SB Latex 233A.
[3] A 50:50 weight blend of the two components.

The data in the above table demonstrates the effectiveness of the additive of this invention in increasing the green strength of articles prepared using it.

EXAMPLE 2

The green strength and green density of the pellets prepared as described above were tested using 1 weight percent additive and varying amounts of a binder, a 20,000 molecular weight polyethylene glycol. The results obtained are shown in Table II below.

TABLE II

| ADDITIVE | BINDER (wt %) | GREEN DENSITY (g/cc) | GREEN STRENGTH (psi) |
| --- | --- | --- | --- |
| None[1] | | 1.74 | 19.18 |
| None[1] | 0.33 | 1.78 | 22.44 |
| | 0.67 | 1.77 | 21.09 |
| | 1.0 | 1.78 | 20.86 |
| Ethylenediamine | 0.33 | 1.74 | 28.66 |
| | 0.67 | 1.74 | 26.80 |
| | 1.0 | 1.75 | 27.15 |

[1] Not an embodiment of the invention.

EXAMPLE 3

Example 2 is repeated with the exception that the additive includes a styrene butadiene latex in varying amounts and the amount of alkylenediamine portion of the additive is varied as shown in Table III below.

TABLE III

| AMINE ADDITIVE | LATEX ADDITIVE (%) | GREEN DENSITY (g/cc) | GREEN STRENGTH (psi) |
| --- | --- | --- | --- |
| None[1] | None | 1.74 | 19.18 |
| None[1] | 0.33 | 1.79 | 28.17 |
| | 0.67 | 1.77 | 31.93 |
| | 1.0 | 1.76 | 34.98 |
| Ethylenediamine (1%) | 0.33 | 1.76 | 31.58 |
| | 0.67 | 1.74 | 35.08 |
| | 1.0 | 1.74 | 35.44 |
| Ethylenediamine (0.5%) | 0.33 | 1.75 | 27.61 |
| | 0.67 | 1.73 | 31.48 |
| | 1.0 | 1.73 | 34.17 |

[1] Not an embodiment of the invention.

The above information demonstrates the effectiveness of the process of the present invention in increasing green strength of whiteware ceramic articles.

What is claimed is:

1. A process for the preparation of whiteware ceramic articles having increased green strength comprising:
   (a) preparing a slurry by mixing an additive, selected from the group consisting of (1) an alkylenediamine and (2) a mixture of an alkylenediamine and a latex, in an amount effective to increase the green strength of articles prepared from the slurry composition, with a slurry medium, a clay particulate material comprising ball clays and kaolin clays, and a dispersant;
   (b) removing the slurry medium from the slurry of step (a) to form a powder; and
   (c) pressing the powder using uniaxial or isostatic pressing techniques.

2. The process of claim 1 wherein the additive is an alkylenediamine.

3. The process of claim 2 wherein the additive is ethylenediamine.

4. The process of claim 1 wherein the additive is a mixture of an alkylenediamine and a latex.

5. The process of claim 4 wherein the additive is a mixture of ethylenediamine and a styrene butadiene latex.

6. The process of claim 1 wherein the additive is used in an amount of at least about 0.0001 weight percent and no greater than about 5 weight percent.

7. The process of claim 6 wherein the additive is used in an amount of at least about 0.01 weight percent and no greater than about 2.0 weight percent.

8. The process of claim 7 wherein the additive is used in an amount of greater than about 0.05 weight percent and no greater than about 1.5 weight percent.

9. The process of claim 4 wherein the ratio of the alkylenediamine to latex is at least about 5:95 and no greater than about 95:5.

10. The process of claim 9 wherein the ratio of the alkylenediamine to latex is about 1:1.

11. The process of claim 1 wherein the additive, the slurry medium and the dispersant are mixed together followed by the addition of the clay particulate material.

* * * * *